United States Patent
Bonnefoy et al.

(10) Patent No.: US 12,030,641 B2
(45) Date of Patent: Jul. 9, 2024

(54) SEAT ARRANGEMENT, IN PARTICULAR FOR AN AIRPLANE

(71) Applicant: Safran Seats, Plaisir (FR)

(72) Inventors: Bastien Bonnefoy, Issoudun (FR); Benjamin Foucher, Tours (FR)

(73) Assignee: Safran Seats, Plaisir (FR)

( * ) Notice: Subject to any disclaimer, the term of this patent is extended or adjusted under 35 U.S.C. 154(b) by 879 days.

(21) Appl. No.: 16/979,762

(22) PCT Filed: Mar. 8, 2019

(86) PCT No.: PCT/EP2019/055869
§ 371 (c)(1),
(2) Date: Nov. 13, 2020

(87) PCT Pub. No.: WO2019/175053
PCT Pub. Date: Sep. 19, 2019

(65) Prior Publication Data
US 2021/0163139 A1     Jun. 3, 2021

(30) Foreign Application Priority Data
Mar. 15, 2018 (FR) .................................. 1870291

(51) Int. Cl.
*B64D 11/06* (2006.01)
(52) U.S. Cl.
CPC ...... *B64D 11/0606* (2014.12); *B64D 11/0604* (2014.12)
(58) Field of Classification Search
CPC ..... E06B 2009/2405; E06B 2009/2441; E06B 2009/543; E06B 3/4654; B64D 11/0606;
(Continued)

(56) References Cited

U.S. PATENT DOCUMENTS 2,404,257 A * 7/1946 Thomas ............... E06B 9/54
160/237
3,110,533 A * 11/1963 Le Bron ............... A47B 69/00
312/297
(Continued)

FOREIGN PATENT DOCUMENTS

EP       3225548      10/2017
WO    2018033599     2/2018

OTHER PUBLICATIONS

International Patent Application No. PCT/EP2019/055869, International Preliminary Report on Patentability (Written Opinion of the International Searching Authority), dated Sep. 15, 2020.
(Continued)

*Primary Examiner* — Abe Massad
(74) *Attorney, Agent, or Firm* — Kilpatrick Townsend & Stockton LLP (57) ABSTRACT

A seat arrangement, which is in particular designed to be installed in an airplane cabin, includes:
at least one "front" seat unit and at least one "rear" seat unit, positioned one behind the other along a longitudinal axis of the airplane cabin and comprising respectively at least one seat that can pass from a "seating" position to a "bunk" position;
a transverse passage arranged between the "front" seat unit and the "rear" seat unit to allow access to an aisle.
The seat arrangement comprises at least partially flexible closure means, said closure means being movable between a stowed position, in which the closure means are unobstructed from the aisle, and a deployed position, in which the closure means obstruct the aisle.

10 Claims, 10 Drawing Sheets

(58) Field of Classification Search
CPC .. B64D 11/0604; B64D 11/0641; B64D 11/06
See application file for complete search history.

(56) References Cited

U.S. PATENT DOCUMENTS

| | | | | |
|---|---|---|---|---|
| 5,066,080 | A * | 11/1991 | Woodward | E06B 9/115 |
| | | | | 312/297 |
| 5,135,040 | A * | 8/1992 | Ruiter | E05D 15/165 |
| | | | | 160/191 |
| 10,202,073 | B2 * | 2/2019 | Schuett | B60J 7/0015 |
| 11,613,360 | B2 * | 3/2023 | Dowty | B64D 11/0023 |
| | | | | 244/118.6 |
| 11,691,732 | B2 * | 7/2023 | Frost | B64C 1/1461 |
| | | | | 244/129.5 |
| 2003/0146654 | A1 | 8/2003 | Nguyen et al. | |
| 2013/0241247 | A1 * | 9/2013 | Wallace | B64D 11/0604 |
| | | | | 297/118 |
| 2015/0053817 | A1 | 2/2015 | Wartena et al. | |
| 2017/0305339 | A1 * | 10/2017 | Lin | G02B 6/0068 |
| 2018/0281963 | A1 * | 10/2018 | Dowty | B64D 11/0606 |

OTHER PUBLICATIONS

International Patent Application No. PCT/EP2019/055869, International Search Report (and English translation) and Written Opinion, dated May 14, 2019.

* cited by examiner

SEAT ARRANGEMENT, IN PARTICULAR FOR AN AIRPLANE

The present invention relates to a seat arrangement, in particular of seats for passengers of a transport vehicle, in particular of an airplane. The invention aims to provide a seat arrangement of this kind which ensures both the comfort and the safety of the passengers, while giving them privacy. The invention thus has a particularly advantageous application in airplane seats.

The "Business Class" type of airplane seat offer passengers different comfort positions, from a "seated" position to a "bed" position in which the seat creates a substantially horizontal lying surface on which the passenger can lay down.

Intermediate comfort positions are also proposed, such as the "relax" position in which the backrest is greatly reclined. Generally, these intermediate positions are obtained by the angle of the backrest, which pivots about a horizontal axis and perpendicularly to an axis of extension of the seat. The passenger can then remain on the seat during transitions between the different positions.

The bed generally consists in particular of the backrest, the seat surface, a leg rest and a footrest; the latter can be attached or linked to the seat kinematics.

Certain "Business Class" airplane cabin seat arrangements allow direct access to an aisle for all passengers via a passage arranged between two seats which are arranged one behind the other along a longitudinal axis of the airplane cabin. Passengers can thus easily get out of their seat, especially when the seat is in the "bed" position.

Therefore, when a passenger or a crew member is walking in an aisle located to the side of the seat, in particular towards the rear of the airplane cabin, they are likely to be in direct visual contact with a passenger seated in a seat. Such a situation creates a lack of privacy, which can cause a feeling of discomfort for the seated passenger.

The invention aims in particular to effectively remedy this drawback by proposing a seat arrangement, in particular intended to be installed in an airplane cabin, comprising:
- at least one "front" seat unit and at least one "rear" seat unit located one behind the other along a longitudinal axis of the airplane cabin and respectively comprising at least one seat capable of passing from a "seated" position to a "bed" position,
- a transverse passage disposed between the "front" seat unit and the "rear" seat unit to allow access to an aisle, characterized in that the seat arrangement comprises at least partly flexible closure means, said closure means being movable between a stowed position in which the closure means are clear of the passage and a deployed position in which the closure means close the passage.

The invention thus makes it possible to define an enclosed interior space around the seat which gives the passenger a feeling of privacy by preventing them from being in direct view of other passengers and/or crew members walking in the aisle.

According to an embodiment, the closure means comprise a curtain, in particular made of fabric at least in part, and a device for returning the curtain to the stowed position so as to create tension on the curtain when the curtain is in the deployed position.

According to an embodiment, the return device comprises a roller provided with a shaft around which at least part of the curtain is wound when the curtain is in the stowed position.

According to an embodiment, the roller is attached to the front seat unit.

According to an embodiment, the roller is arranged between a backrest and a fixed shell of the rear seat unit.

According to an embodiment, the return device comprises at least one resilient return member, such as a spring.

According to an embodiment, the resilient return member is attached both to the front seat unit and to an end edge of the curtain.

According to an embodiment, said seat arrangement comprises means for holding the curtain in the deployed position, such as a handle intended to cooperate with a support carried by the rear seat unit and/or a magnetic device.

According to an embodiment, said seat arrangement comprises at least one translational guide for the curtain that is attached to the front seat unit.

According to an embodiment, said seat arrangement comprises means for stiffening the curtain, such as cords or a flexible plate.

According to an embodiment, the stiffening means extend beyond the guide.

According to an embodiment, the curtain comprises a first part made of a thin fabric and a second part made of a thick fabric attached to the first part, the second part having patterns.

According to an embodiment, said seat arrangement comprises means for generating a light pattern.

According to an embodiment, the means for generating a light pattern comprise a light source and translucent wires arranged in a thickness of the curtain.

According to an embodiment, the means for generating a light pattern comprise a light panel arranged inside the curtain.

According to an embodiment, the means for generating a light pattern comprise an assembly of lamps, in particular of the LED type.

According to an embodiment, perforations made in the curtain allow a desired pattern to appear.

According to an embodiment, the closure means comprise a semi-flexible curtain alternating between strips and folding zones.

According to an embodiment, the strips are oriented vertically.

According to an embodiment, the semi-flexible curtain is formed by a plurality of strips that are spaced apart and are covered by fabric, the portions of the fabric extending between two adjacent strips forming the folding zones.

According to an embodiment, an end edge of the semi-flexible curtain is rotatably mounted about a vertical shaft relative to a seat unit.

According to an embodiment, the semi-flexible curtain is configured to conform to a shape of a shell of the front seat unit in the stowed position.

According to an embodiment, the semi-flexible curtain is configured such that the strips are folded over one another in the stowed position.

According to an embodiment, said arrangement comprises means for holding the semi-flexible curtain in the stowed position and in the deployed position, in particular of the magnetic type.

Of course, the various features, variants and/or embodiments of the present invention may be associated with each other in various combinations provided that they are not incompatible or mutually exclusive.

The present invention will be better understood and other features and advantages will become apparent upon reading the following detailed description containing embodiments provided for illustrative purposes with reference to the appended drawings, which are given by way of non-limiting example and may be used to supplement the understanding of the present invention and the description of the implementation of the invention and, where appropriate, to contribute to the definition of the invention, in which.

It should be noted that, in the drawings, the structural and/or functional elements common to the various embodiments may have the same reference signs. Therefore, unless otherwise stated, such elements have identical structural, dimensional and material properties.

Figure 1:
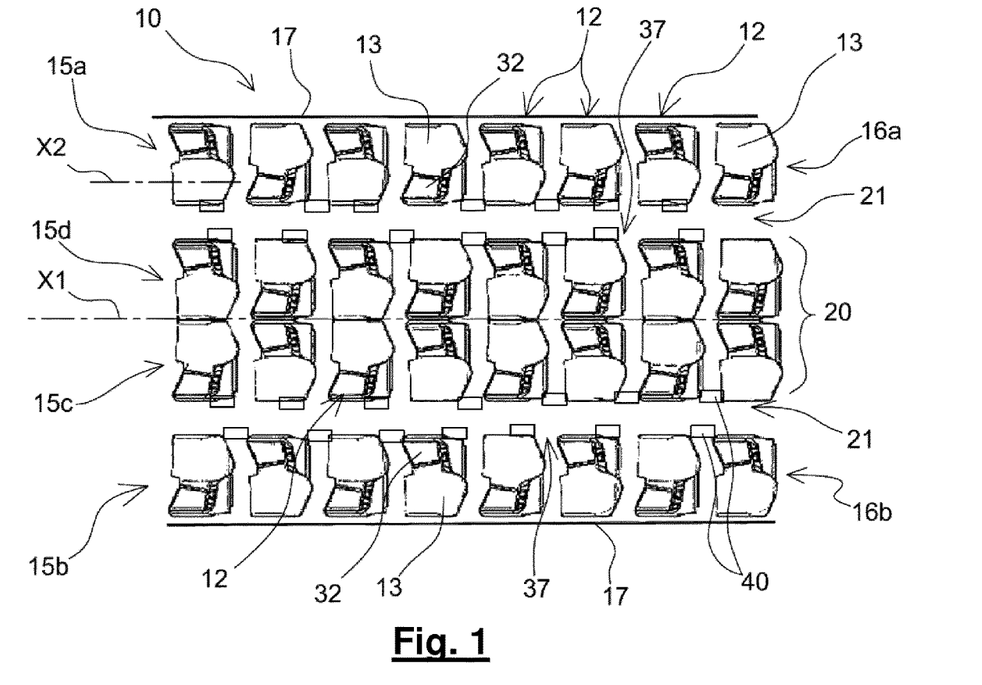
FIG. 1 is a schematic plan view of an airplane cabin incorporating a seat arrangement according to the present invention.

FIG. 1 shows an airplane cabin 10 extending along a longitudinal axis X1 comprising a seat arrangement 11. The seat arrangement 11 according to the present invention comprises a plurality of seat units 12 that each comprise an individual seat 13. Advantageously, the seat 13 is capable of passing from a "seated" position, corresponding to the position used in particular during the stopping, take-off and landing phases of the airplane, and a "bed" position, in which the seat 13 defines a substantially horizontal lying surface for the passenger. In particular, the "seated" position and the "bed" position constitute configurations of the seat 13 in two end positions. According to variants, the seat 13 may also assume intermediate positions, referred to as relax positions, between these two end positions.

The plurality of seat units 12 are arranged in at least one row 15a that preferably extends along the longitudinal axis X1 of the airplane cabin 10. According to the example shown in FIG. 1, the plurality of seat units 12 are arranged in four rows 15a, 15b, 15c and 15d.

According to various particular embodiments, within row 15a, or rows 15a, 15b, 15c and 15d, respectively, the seat unit 12 can be oriented such that the seat 13 faces forward and/or towards the rear of the airplane.

It should be noted that, in the remainder of the description, the terms "front" and "rear" used in relation to the expression "seat unit" locally define a relative position of the seat 13 within the row 15a, or the rows 15a, 15b, 15c and 15d, respectively, and do not refer in any way to an orientation of the seat 13 within the airplane cabin 10. In other words, the term "front seat unit" means that the seat unit is positioned directly in front of another seat unit within the row, while the term "rear seat unit" means that the seat unit is positioned directly behind another seat unit within the row.

According to the exemplary embodiment shown, the seat arrangement 11 comprises two side groups 16a, 16b comprising seat units 12. The two side groups 16a, 16b are formed by two rows 15a, 15b, respectively, of seat units 12 positioned along a side wall 17 of the fuselage of the airplane cabin 10. The seat arrangement 11 also comprises a central group 20. The central group 20 is preferably formed by two rows 15c, 15d of seat units 12. In such an arrangement, the two rows 15c, 15d of seat units 12 particularly adjoin one another laterally.

The side groups 16a, 16b are each separated from the central group 20 by an aisle 21. According to the configuration shown in FIG. 1, two aisles 21 are therefore provided in the airplane cabin 10, specifically between each side group 16a, 16b and the central group 20. In a variant, the two side groups 16a, 16b could each be formed by several rows of seat units 12.

Each seat 13 has an axis of extension X2 substantially corresponding to a direction of longitudinal extension of the seat 13. In particular, the axis of extension X2 corresponds to the direction of longitudinal extension of the seat 13 in the "bed" position. In this case, the axis X2 is substantially parallel to the longitudinal axis X1 of the airplane cabin, that is to say it forms an angle of less than 10 degrees with respect to the axis X1. In a variant, the axis of extension X2 of a seat forms a non-zero angle greater than 10 degrees with the longitudinal axis X1 of the airplane cabin 10. Chevron seat configurations can then be defined in which the two seat units 12 form a "V." The tip of the "V" shape may be located in front of or behind the backrests 24 of the seats 13 when they are in an inverted chevron configuration.

In the example shown, the seats 13 are oriented towards the front of the airplane cabin 10, that is to say in the direction of a zone comprising a cockpit of the airplane. In an alternative embodiment, the seats 13 are oriented towards the rear of the airplane cabin 10, that is to say in the direction of a zone opposite the airplane cockpit.

Figure 2:
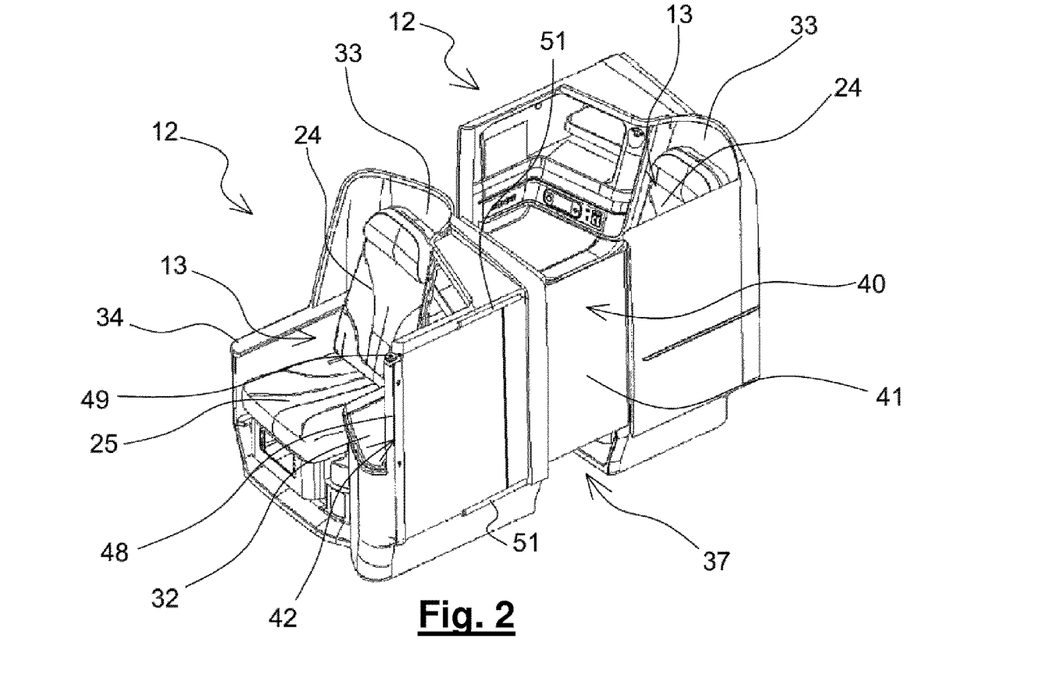
FIGS. 2 and 3 are perspective views of an assembly of two seats separated by a passage capable of being closed by closure means according to the invention.

As is illustrated in particular by FIG. 2, each seat unit 12 comprises a seat 13 having a backrest 24, which is in particular adjustable in inclination, and a seat surface 25, which is in particular potentially adjustable in inclination. In addition, the seat 13 may comprise a leg rest (not shown), which is in particular adjustable in inclination. In addition, the seat unit 12 may comprise a footrest 27, which is visible in particular in FIG. 3.

Figure 3:
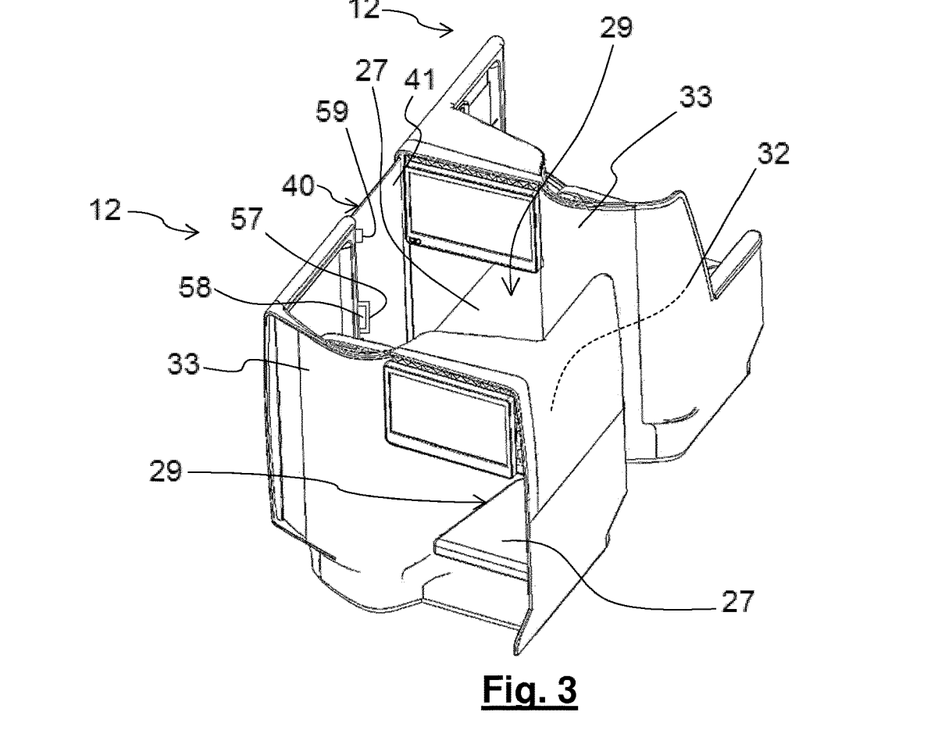

According to a variant, the footrest 27 may be formed by a fixed cushion, which is in particular arranged in a housing 29 dedicated to receiving the passenger's feet. Preferably, the footrest 27 is located in the extension of the seat 13 when the latter is in the "bed" position.

The seat unit 12 may also comprise side furniture 32, which can in particular serve as a fixed shelf and/or as tray table storage.

The seat unit 12 may also comprise a fixed shell 33 that is capable of ensuring separation. A fixed shell 33 of this kind thus makes it possible to ensure the privacy of each passenger. Advantageously, in order to fulfill such a function of ensuring privacy, the fixed shell 33 extends around the backrest 24 of the seat 13 in order to create a partly enclosed interior space in which the seat 13 is arranged.

When two seat units 12 are arranged one behind the other, advantageously, the two seat units 12 are arranged so as to define an at least partially vertical overlap therebetween. The vertical overlap between the two seat units 12 may consist, as shown, in positioning the housing 29 of the footrest 27 of the "rear" seat unit 12 under the side furniture 32 of the corresponding "front" seat unit 12.

A distinction is also drawn between a "left" seat unit 12, in which the side furniture 32 is arranged to the left of the seat 13, and a "right" seat unit 12, in which the side furniture 32 is arranged to the right of the seat 13. A row 15a, 15b, 15c, 15d is formed by alternating "left" seat units 12 and "right" seat units 12, such that each seat 13 is located in front of side furniture 32 of the front seat unit comprising the housing 29 of the corresponding footrest 27.

In addition, the seat unit 12 may comprise an armrest 34. According to certain configurations, the armrest 34 may be retractable such that it is movable between a "raised" position in which the armrest 34 is capable of supporting a part of the passenger's body, in particular a passenger's arm, and a "stowed" position in which the armrest 34 is capable of being positioned at the same level as the seat surface 25 of the seat 13, in particular when said seat is in a sitting position. The passenger can thus take advantage of comfort positions by placing, for example, a part of their body, in particular a leg, on the armrest 34 when in the "stowed" position.

Figure 4A:
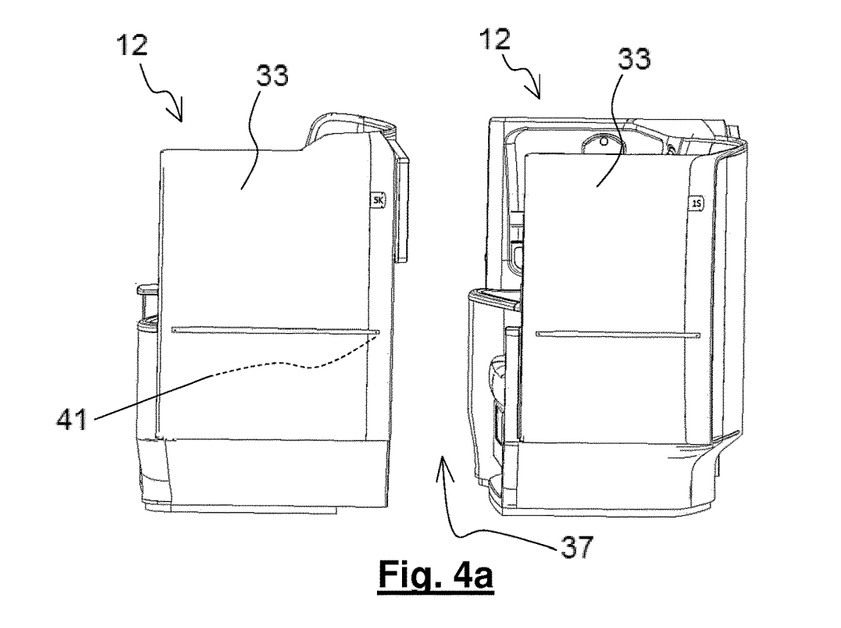
FIGS. 4a and 4b are views of the assembly of two seats showing the closure means in the stowed position and the deployed position, respectively.

As can be seen in particular in FIGS. 1, 2 and 4a, a transverse passage 37 is formed between two consecutive seat units 12 of a row 15a, or the rows 15a, 15b, 15c and 15d, respectively, namely a front seat unit 12 and a rear seat unit 12. More specifically, according to the exemplary embodiment shown, the transverse passage 37 extends between the shells 33 of the front seat unit 12 and the rear seat unit 12.

The transverse passage 37 is arranged to allow the passenger to move from the seat 13 to the aisle 21, in particular when the seat 13 is in the bed position.

According to the present invention, closure means 40, in particular removable closure means 40, are arranged in the transverse passage 37. The closure means 40 are capable of ensuring the closure of the transverse passage 37.

Figure 4B:
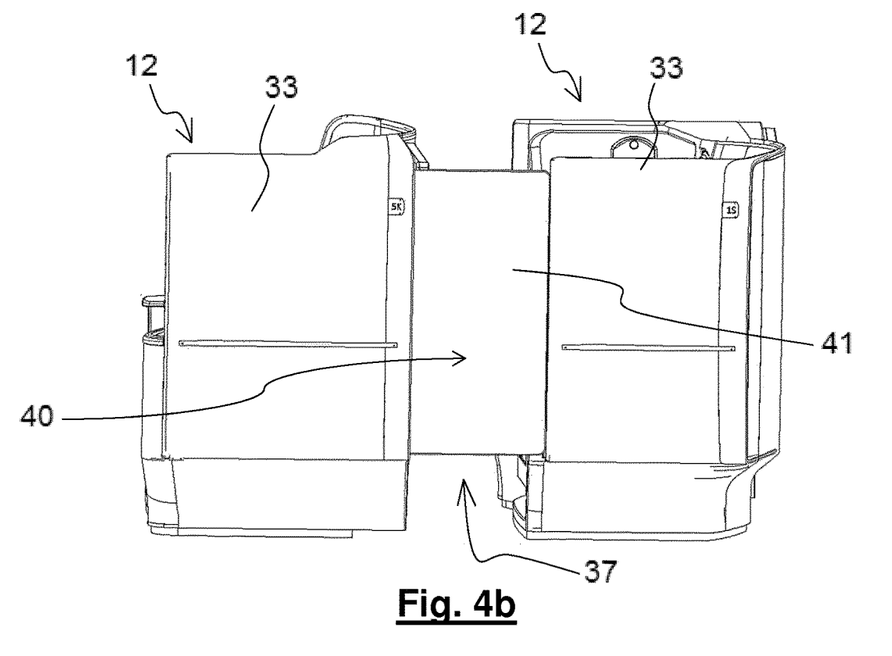

When the closure means 40 are deployed, as shown in particular in FIGS. 2 and 4b, the transverse passage 37 between two consecutive seat units 12 from the row 15a, or the rows 15a, 15b, 15c, 15d, respectively, is closed by the closure means 40.

Therefore, the passenger sitting in the seat 13 is separated from any other passengers and/or crew members walking in the aisle 21 by the closure means 40, which cooperate with the fixed shell 33 extending around the seat 13. The passenger is thus seated in a privacy area defined by the enclosed space that is thus produced.

In the embodiment in FIG. 2 to 12b, the closure means 40 comprise a curtain 41, in particular made of fabric, and a device 42 for returning the curtain 41 to the stowed position so as to create tension on the curtain 41 when the curtain 41 is in the deployed position.

Figure 5:
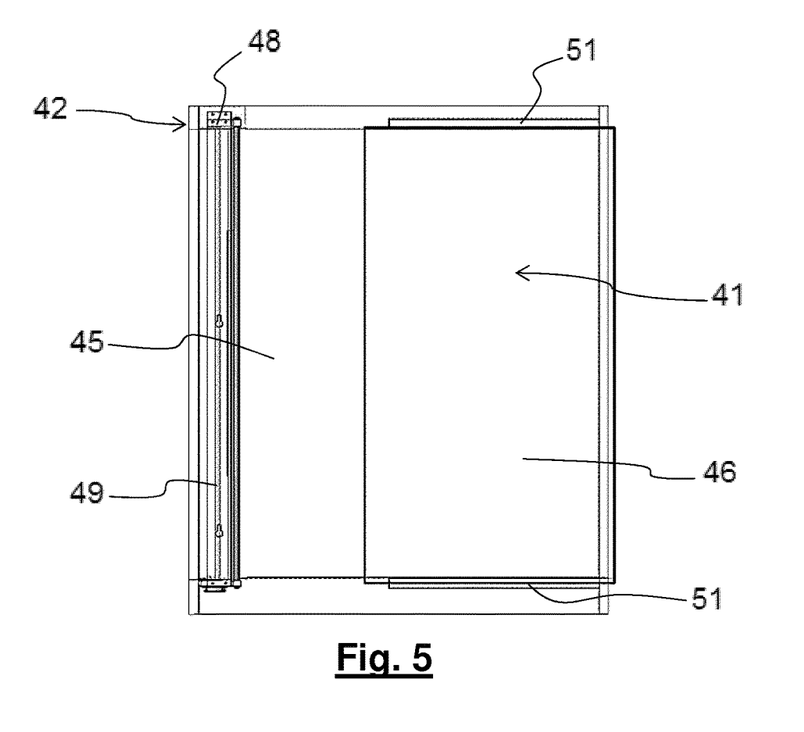
FIG. 5 is a side view illustrating the structure of a curtain forming the closure means according to the invention.

In this case, as can be seen in FIG. 5, the curtain 41 comprises a first part 45 made of a thin fabric, called a technical part, and a second part 46 made of a thick fabric attached to the first part 45 by being sewn to this first part 45, for example. The second part 46 is thicker than the first part 45, which is why the terms "thin" and "thick" must be understood in relation to the thickness of these two parts 45 and 46. The second part 46 is called the aesthetic part because it may have patterns, such as the logo of an airline. The second part 46 could for example be made of fabric, Alcantara, or leather to increase the perceived quality of the ensemble.

Figure 6:
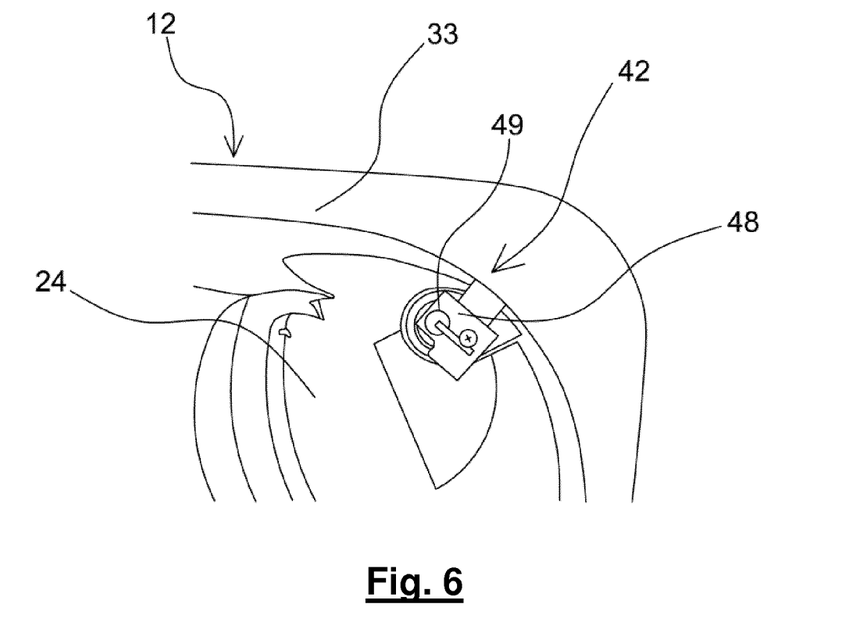
FIG. 6 is a plan view showing the installation of a curtain roller behind a backrest.

In addition, the return device 42 comprises a roller 48 provided with a shaft 49 around which the technical part of the curtain 41 is wound when the curtain 41 is in the stowed position. The roller 48 has a vertical orientation when installed on the seat unit 12. In the example shown, the roller 48 is attached to the front seat unit 12. In a variant, the roller 48 is attached to the rear seat unit 12. The roller 48 can be arranged between the backrest 24 and the shell 33 of the rear seat, as shown in FIG. 6.

Figure 7:
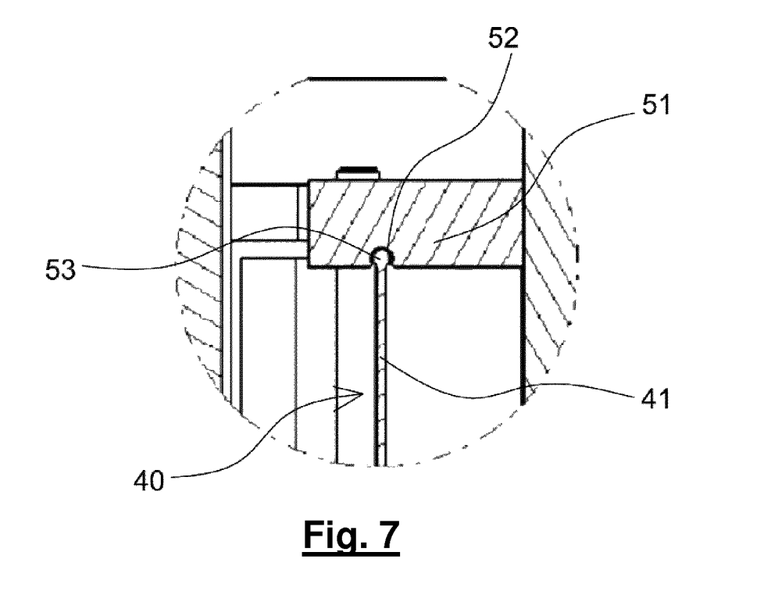
FIG. 7 is a cross-sectional view through a guide for the closure means according to the present invention.

At least one, preferably two, translational guides 51 for the curtain 41 that is attached to the shell 33 of the front seat unit 12 can be provided, as shown in FIGS. 2 and 5. The guides 51 cooperate with the upper edge and the lower edge of the curtain 41, respectively. In FIG. 7, a guide 51 comprises a housing 52 of complementary shape to a profile 53 attached to the curtain 41. In cross section, the profile 53 is provided with a round section head, or alternatively in the shape of a dovetail, or any other shape suitable for the application.

Figure 10:
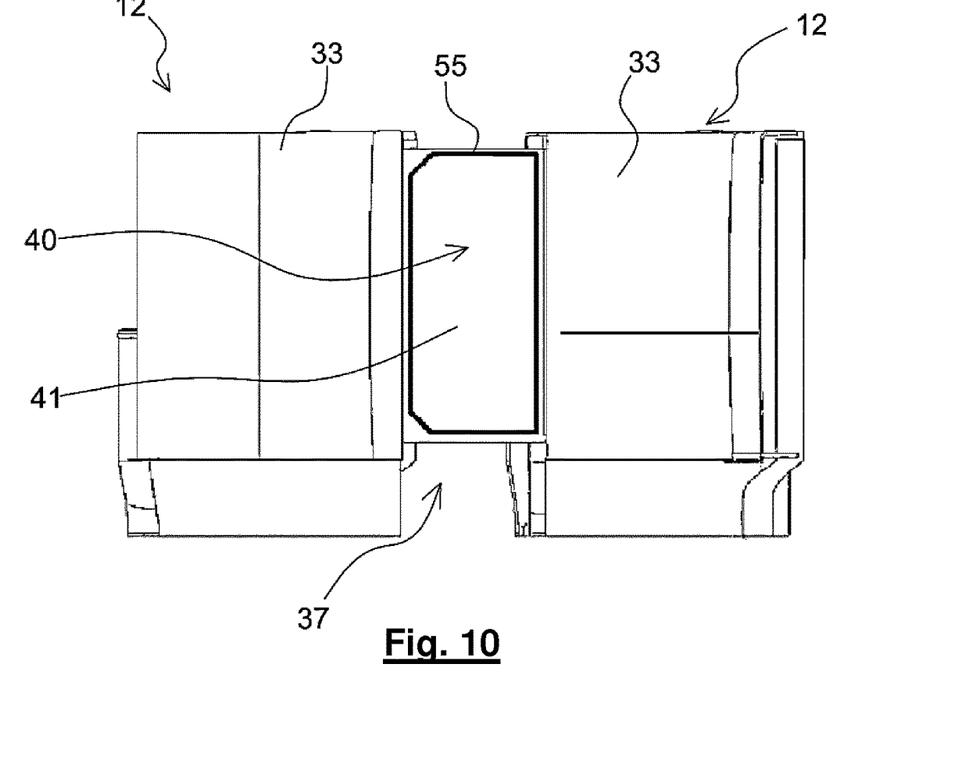
FIG. 10 is a side view of an assembly of two seats showing the integration of stiffening means inside the curtain according to the present invention.

As can be seen in FIG. 10, the curtain 41 may comprise stiffening means 55, such as cords and/or rigid edges and/or a flexible plate. These means 55 may extend along the edge of the curtain 41.

The stiffening means 55 are arranged at least in part of the zone of the curtain 41 intended to cooperate with the guide 51. This zone corresponds to the aesthetic part 46 of the curtain 41, for example.

Figure 8:
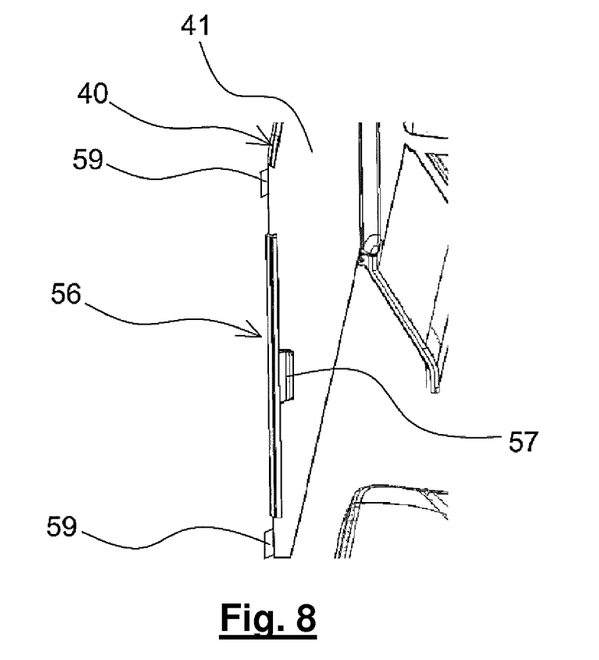
FIG. 8 is a perspective view of a handle used to move the curtain according to the invention from a stowed position into a deployed position.

The curtain 41 further comprises means 56 for holding said curtain 41 in the deployed position. As shown in FIG. 8, these holding means 56 comprise, for example, a handle 57 forming a hook intended to cooperate with a support 58, in particular in the form of a square, carried by the rear seat unit 12 (cf. FIG. 3). Magnetic holding devices 59 arranged on either side of the handle 57 can also be used in combination. The holding means 56 may be breakable beyond a limit force. Alternatively, the curtain 41 could include fusible seams.

Thus, in operation, the passenger would be able to pull the curtain 41 towards them by means of the handle 57 in a rectilinear direction, such that the curtain 41 can slide along the guides 51. Once the curtain 41 has traveled its course until it reaches the deployed position, the passenger causes the handle 57 to cooperate with its retaining support 58 while the possible magnetic holding devices 59 arranged on either side of the handle 57 also generate a retaining force. The tension applied by the roller 48 keeps the curtain 41 taut in the deployed position. Preferably, as shown in FIG. 5, the stiffening means 55 extend beyond the guides 51 to ensure guidance even in the event of the passenger exerting excessive force on the curtain 41.

By releasing the handle 57 from its support, the return force applied by the roller 48 is greater than the retaining force of the magnetic retaining devices 59, and therefore the curtain 41 automatically returns to its stowed position.

Figure 9:
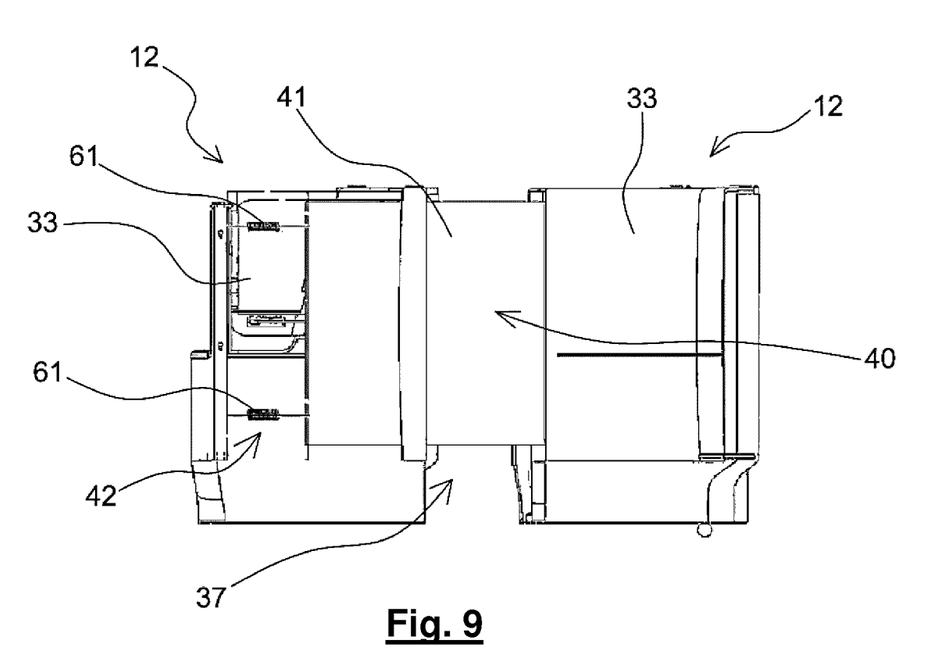
FIG. 9 is a side view of the assembly of two seats showing a variant of the spring return device.

In a variant, in the embodiment in FIG. 9, the return device 42 comprises at least one resilient return member 61, such as a spring. In the example shown, two springs 61 are used, which are each fixed both to the front seat unit 12 and to an end edge of the curtain 41.

Figure 11:
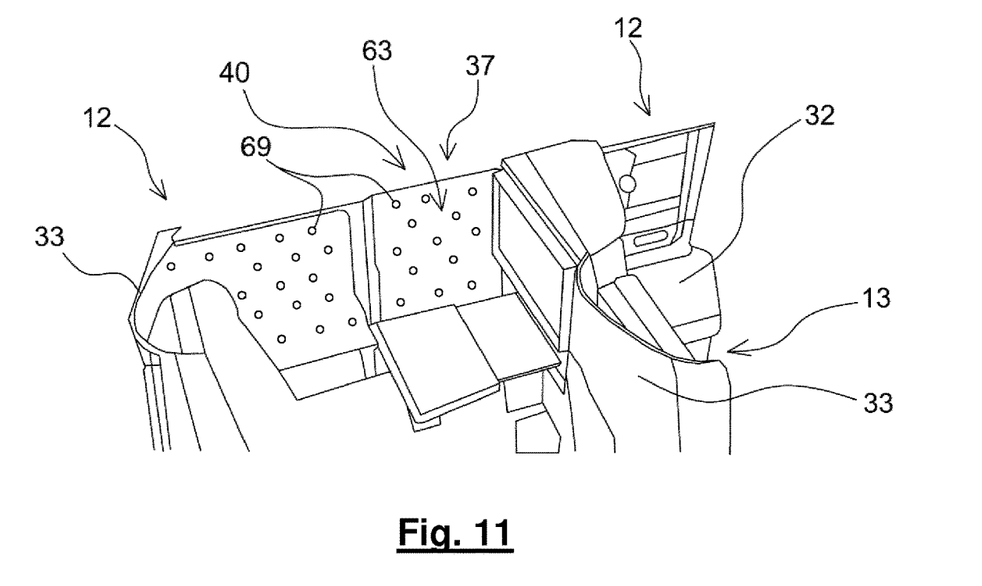
FIG. 11 is a perspective view of an assembly of two seats provided with a curtain integrating means for generating a light pattern according to the present invention.
Figure 12A:
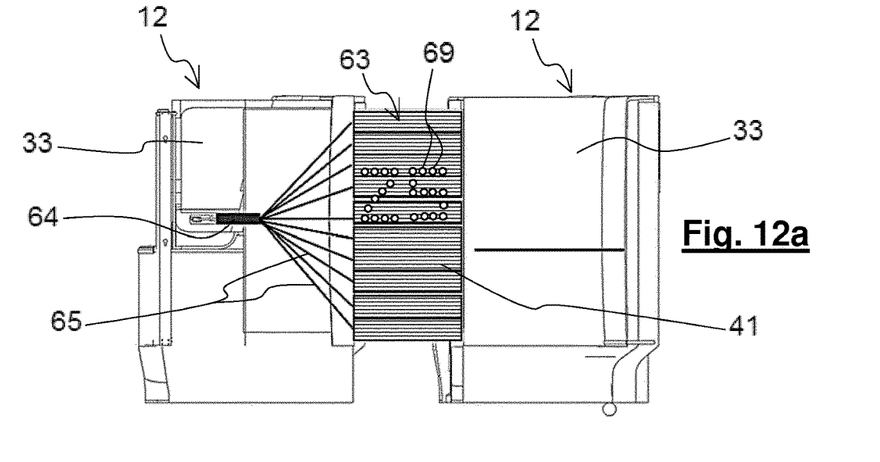
FIGS. 12a, 12b and 12c are views illustrating three embodiments of the means for generating a light pattern according to the present invention.
Figure 12B:
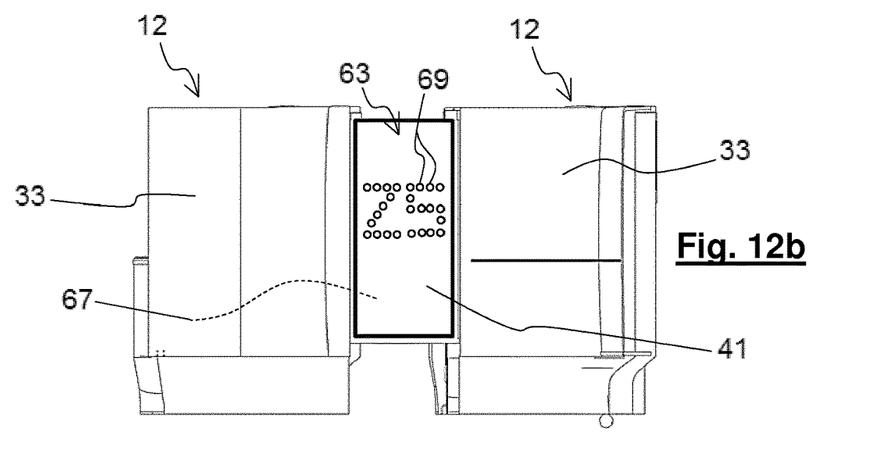
Figure 12C:
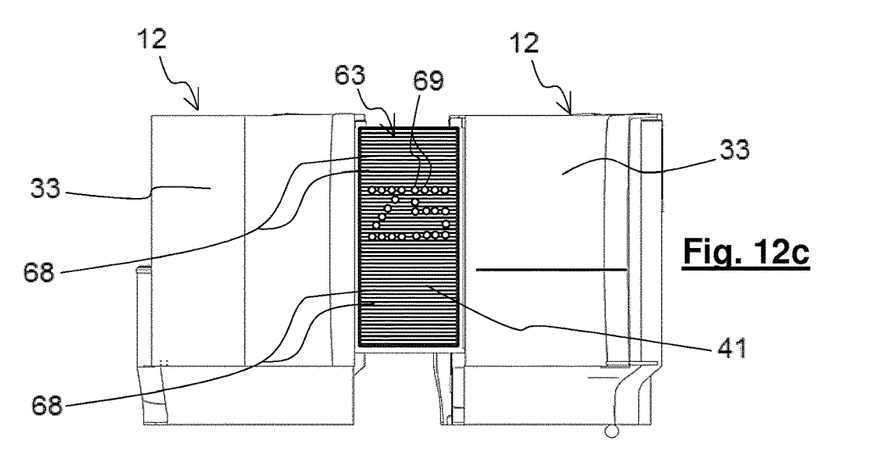

In the embodiment in FIG. 11, the curtain 41 integrates means 63 for generating a light pattern. These means 63 may comprise a light source 64 and translucent wires 65 arranged in the thickness of the curtain 41, as illustrated by FIG. 12*a*, or a luminous panel 67, which is preferably flexible, arranged inside or on the curtain 41, as illustrated by FIG. 12*b*. Alternatively, it is possible to use an assembly of lamps 68, in particular of the LED type, as illustrated in FIG. 12*c*. In all cases, a configuration of perforations 69 made in the curtain 41 allow the desired pattern to appear.

In the embodiments in FIG. 13 to 17, the closure means 40 comprise a semi-flexible curtain 71 alternating between vertical 72 strips 72 and folding zones 73. The semi-flexible curtain 71 can be folded along the zones 73 at least in part.

Figure 16:
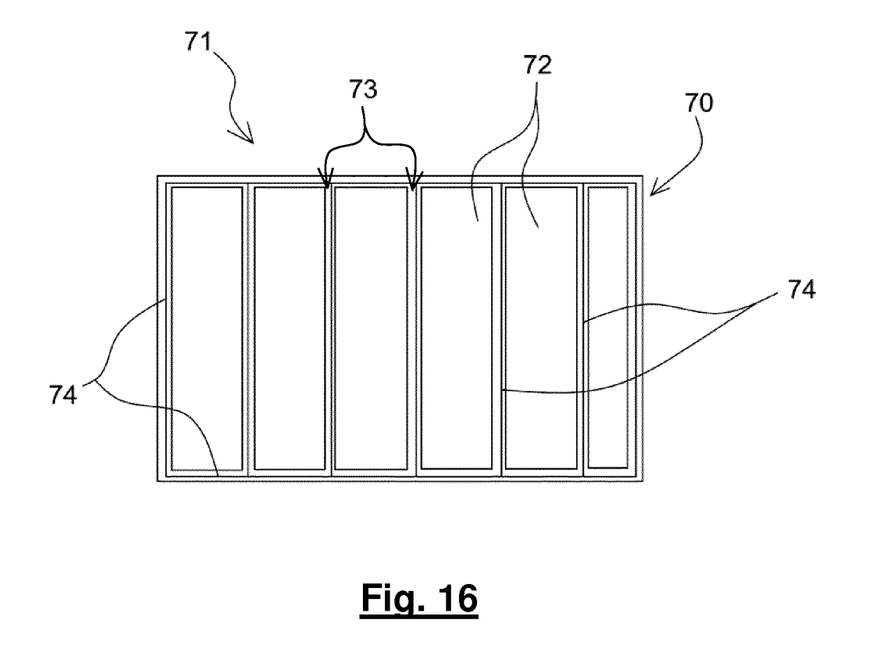
FIG. 16 is a front view of the various elements forming a semi-flexible curtain according to the present invention.

In the embodiment in FIG. 16, the semi-flexible curtain 71 is formed by a plurality of strips 72 that are spaced apart in a regular manner and are covered by fabric 70, the portions of the fabric 70 extending between two adjacent strips 72 forming the folding zones 73. Glue 74 may be arranged between the strips 72 and over the entirety of the edge of the fabric 70 to ensure the assembly of the various elements. The strips 72 may be made of a rigid or semi-rigid plastics material.

An end edge of the semi-flexible curtain 71 is rotatably mounted about a vertical shaft 75 relative to a seat unit 12, in this case the front seat unit.

Figure 13A:
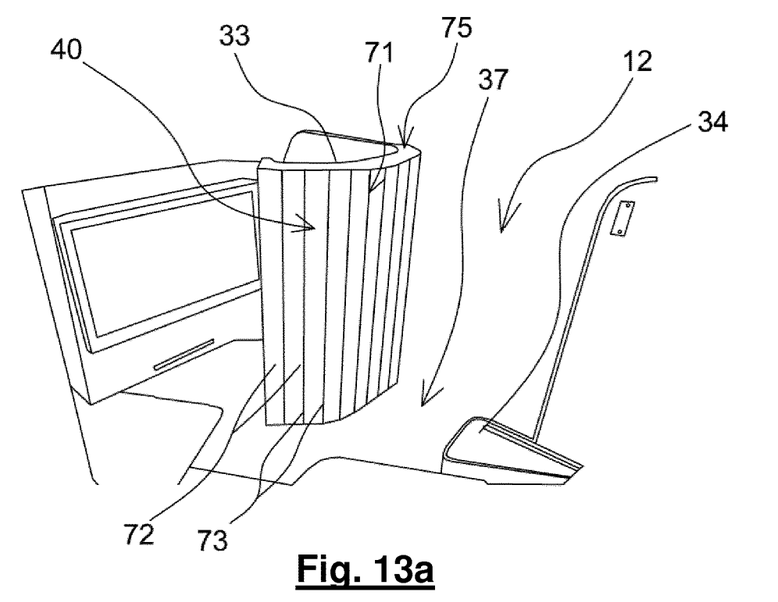
FIGS. 13a and 13b show closure means formed by a semi-flexible curtain in a stowed position and a deployed position, respectively.
Figure 14:
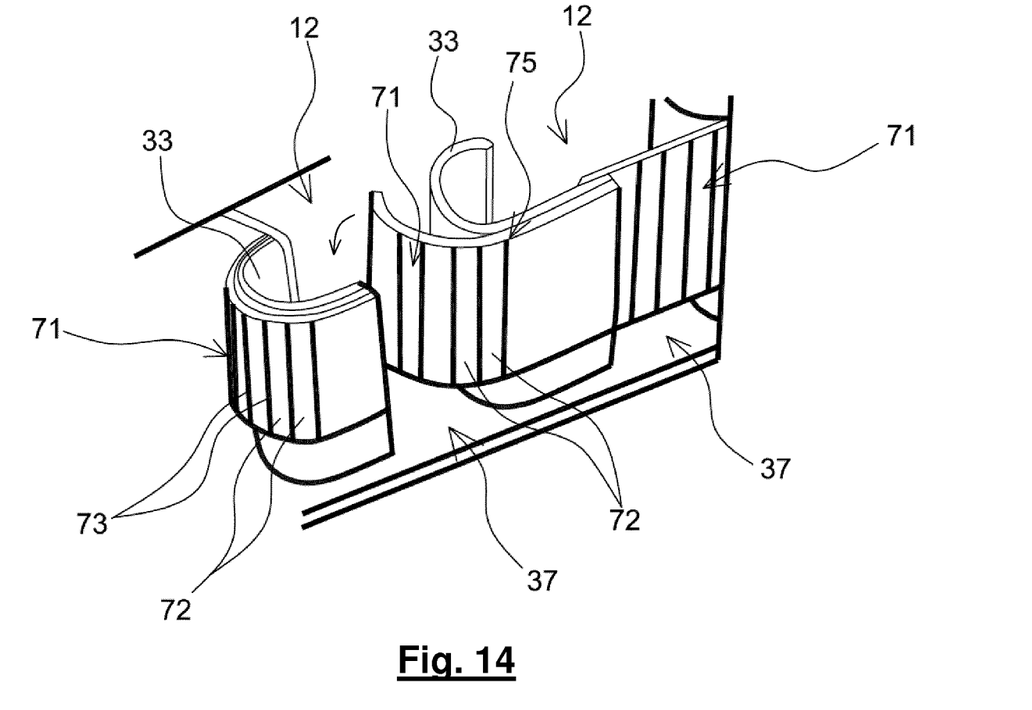
FIG. 14 is a perspective view illustrating a deployment phase of the semi-flexible curtain according to the present invention.

As illustrated by FIGS. 13*a* and 14, the semi-flexible curtain 71 is configured to conform to a rounded shape of the shell 33 of the front seat unit 12 in the stowed position. This is made possible by the fact that the strips 72 can be folded relative to each other such that the assembly of the strips 72 which are slightly bent relative to each other generally take a curved shape corresponding to the curvature of the shell 33 front seat unit 12.

Figure 13B:
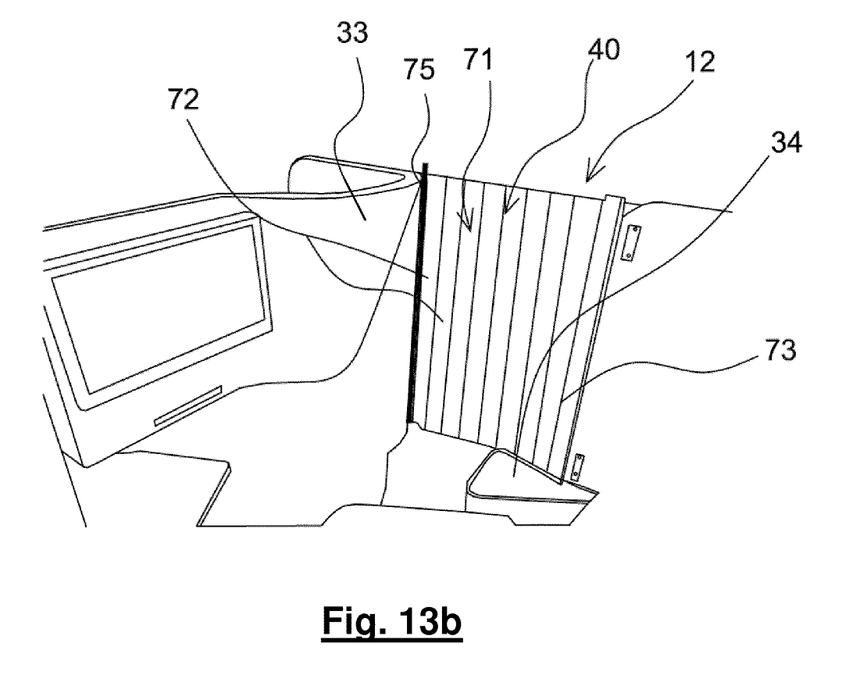

To move the curtain 71 from the stowed position to the deployed position, the passenger rotates the curtain 71 about the shaft 75 until the slats 72 extend substantially in the same plane, such that the curtain 71 closes the transverse passage 37 between the two seat units 12, as shown in FIGS. 13*b* and 14.

Figure 15:
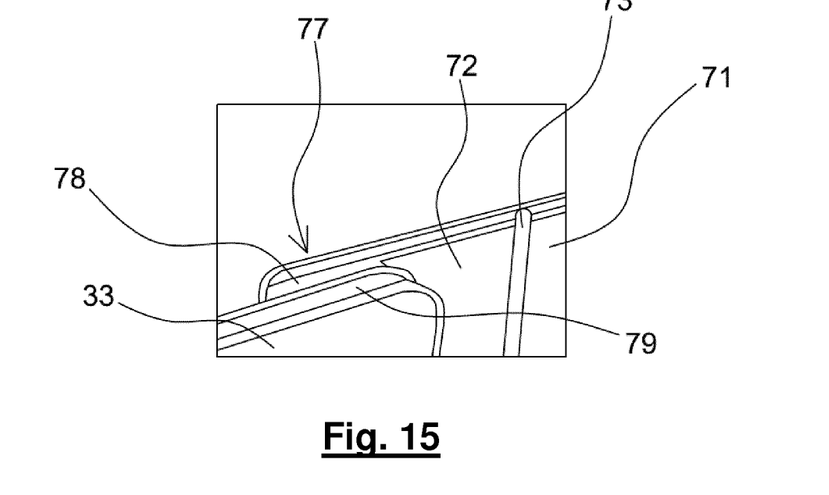
FIG. 15 is a detailed view of the magnetic holding means of the semi-flexible curtain in the stored position and the deployed position.

As can be seen in FIG. 15, it is possible to use means 77 for holding the curtain 71 in the stowed position and in the deployed position, in particular of the magnetic type. It is thus possible to use a magnet 78 to magnetically attach the free end edge of the curtain 71 to a metal support 79 that is integral with a seat unit 12.

Figure 17:
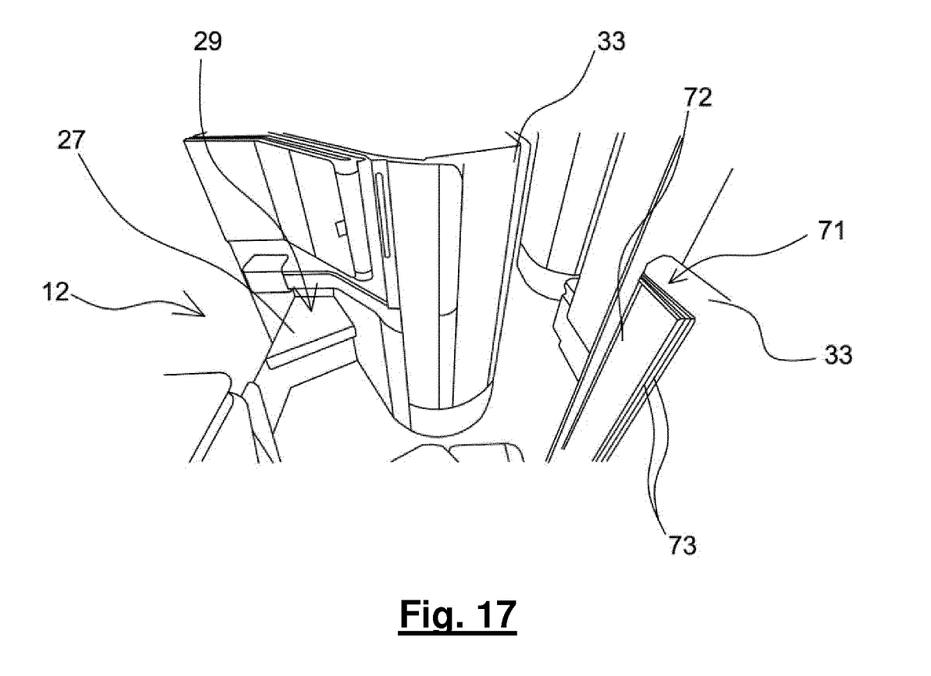
FIG. 17 is a perspective view of a semi-flexible curtain having an accordion configuration in the stowed position.

Alternatively, as can be seen in FIG. 17, the semi-flexible curtain 71 is configured such that the vertical strips 72 are folded over one another in the stowed position. The curtain 71 therefore has an accordion-like structure in which the strips 72 are superimposed on each other over the majority of their surface. In a variant, the strips 72 could be oriented horizontally.

It should be noted that the present invention is not limited to a cabin arrangement in which each seat 13 is oriented towards the aisle 21 of the airplane cabin 10. It also covers any arrangement of airplane cabins 10 in which there is a transverse passage 37 arranged between two seat units 12 arranged one behind the other along a longitudinal axis X1 of the airplane cabin 10 allowing direct access to an aisle 21.

It is therefore also applicable to seat arrangements in which the seats are turned in a direction opposite to that of the aisle 21 (known as a "herringbone" type configuration). Alternatively, the seats 13 have an axis X2 parallel to the axis X1 of the cabin 10.

The invention may also be implemented with seats installed in other means of transport, such as seats for buses, trains, or boats.

Of course, the invention is not limited to the embodiments described above, which are provided solely by way of example. It covers various different modifications, alternative forms and other variants that may be considered by a person skilled in the art in the context of the present invention, and in particular any combination of the different modes of operation described above, which can be taken in isolation or combination.

The invention claimed is:

1. A seat arrangement comprising:
at least one front seat unit and at least one rear seat unit located one behind the other along a longitudinal axis of an airplane cabin and respectively comprising at least one seat capable of passing from a seated position to a bed position,
a transverse passage disposed between the front seat unit and the rear seat unit to allow access to an aisle,
wherein the seat arrangement comprises at least partly flexible closure means, said closure means being movable between a stowed position in which the closure means are clear of the passage and a deployed position in which the closure means close the passage,
the closure means comprising a curtain and a return device for returning the curtain to the stowed position so as to create tension on the curtain when the curtain is in the deployed position,
the return device comprising a single roller provided with a single shaft around which at least part of the curtain is wound when the curtain is in the stowed position,
wherein the curtain comprises a technical part made of a first fabric and an aesthetic part made of a second fabric, wherein the second fabric is thicker than the first fabric, wherein the aesthetic part is attached to the technical part and comprises patterns,
wherein only the technical part is wound around the shaft when the curtain is in the stowed position, the aesthetic part being not wound around the shaft when the curtain is in the stowed position,
the seat arrangement further comprising at least one translational guide for the curtain that is attached to the front seat unit,
said translational guide cooperating with an edge of the curtain,
said translational guide comprising a housing of complementary shape to a profile attached to the curtain,
the curtain comprising stiffening means extending along the edge of the curtain,
the stiffening means being arranged at least partly in the aesthetic part of the curtain.

2. The seat arrangement according to claim 1, wherein the roller is attached to the front seat unit.

3. The seat arrangement according to claim 1, further comprising means for holding the curtain in the deployed position, wherein the means for holding the curtain comprise a handle configured to cooperate with a support carried by the rear seat unit or a magnetic device.

4. The seat arrangement according to claim 1, wherein the stiffening means extend beyond the at least one translational guide.

5. The seat arrangement according to claim 1, wherein the roller is arranged between a backrest and a fixed shell of the rear seat unit.

6. The seat arrangement according to claim 1, further comprising means for generating a light pattern.

7. The seat arrangement according to claim 6, wherein the means for generating a light pattern comprise a light source and translucent wires arranged in a thickness of the curtain.

8. The seat arrangement according to claim 6, wherein the means for generating a light pattern comprise a light panel arranged inside the curtain.

9. The seat arrangement according to claim 6, wherein the means for generating a light pattern comprise an assembly of lamps.

10. The seat arrangement according to claim 6, wherein perforations made in the curtain allow a desired pattern to appear.

\* \* \* \* \*